(12) United States Patent
Steeby

(10) Patent No.: US 6,283,892 B1
(45) Date of Patent: Sep. 4, 2001

(54) ACTIVE IN-GEAR POSITIONING

(75) Inventor: Jon A. Steeby, Schoolcraft, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/679,170

(22) Filed: Oct. 4, 2000

Related U.S. Application Data

(63) Continuation-in-part of application No. 09/570,119, filed on May 12, 2000, which is a continuation of application No. 09/330,570, filed on Jun. 11, 1999, now Pat. No. 6,080,082.

(51) Int. Cl.$^7$ .................................................. B60K 41/04
(52) U.S. Cl. ............................................................ 477/111
(58) Field of Search ..................................... 477/107, 110, 477/111

(56) References Cited

U.S. PATENT DOCUMENTS

| | | | |
|---|---|---|---|
| 4,889,014 | 12/1989 | Iwata | 74/858 |
| 5,457,633 | 10/1995 | Palmer et al. | 364/431.09 |
| 5,477,827 | 12/1995 | Weisman et al. | 123/436 |
| 5,679,096 | 10/1997 | Stine et al. | 477/111 |
| 5,738,606 | 4/1998 | Bellinger | 477/111 |
| 5,797,110 | 8/1998 | Braun et al. | 701/84 |
| 5,853,306 | * 12/1998 | Worth et al. | 440/1 |
| 6,080,082 | 6/2000 | Steeby | 477/111 |
| 6,105,449 | * 8/2000 | Genise et al. | 74/335 |

* cited by examiner

Primary Examiner—Dirk Wright
(74) Attorney, Agent, or Firm—Howard D. Gordon

(57) ABSTRACT

A powertrain system (10) control system/method for controlling application of a force to cause full engagement of partially engaged jaw clutch as a function of sensed engine torque.

10 Claims, 3 Drawing Sheets

ACTIVE IN-GEAR POSITIONING

RELATED APPLICATIONS

This application is a continuation-in-part of U.S. Ser. No. 09/570,119, filed May 12, 2000, which is a continuation of Ser. No. 09/330,570, ENGINE OUTPUT TORQUE CONTROL FOR POWERTRAIN WITH ENGAGEABLE POSITIVE CLUTCHES, filed Jun. 11, 1999 now U.S. Pat. No. 6,080,082, assigned to EATON CORPORATION, assignee of this application.

BACKGROUND OF THE INVENTION

1. Field of the Invention

The present invention relates to a control for a vehicular powertrain comprising a fuel-controlled engine and a multiple-ratio drivetrain, including a multiple-speed mechanical transmission and a single- or multiple-speed drive axle assembly. In particular, the present invention relates to a powertrain control wherein the in-gear position of the shift actuator and the engine torque is monitored and, if the in-gear position indicates a less than fully engaged jaw clutch condition and if the engine torque is low, the jaw clutch is urged into full engagement.

2. Description of the Prior Art

Vehicular drivetrains including multiple-speed mechanical transmissions, usually compound transmissions, or simple transmissions coupled with multiple-speed axles, having 7, 9, 10, 13, 16, 18 or more forward speed ratios, are well known in the prior art, especially for heavy-duty vehicles, as may be seen by reference to U.S. Pat. Nos. 5,370,013; 5,527,237 and 4,754,665, the disclosures of which are incorporated herein by reference. Both synchronized and non-synchronized jaw clutches are known in the prior art, as may be seen by reference to U.S. Pat. Nos. 5,546,823; 5,588,516 and 5,642,643, the disclosures of which are incorporated herein by reference.

Control systems and methods for calculating engine output torque (also called "flywheel torque") are known in the prior art, as may be seen by reference to U.S. Pat. No. 5,509,867, the disclosure of which is incorporated herein by reference.

Automated and manual transmission systems wherein engine output torque is controlled and/or limited as a function of engaged gear ratio and/or vehicle speed are known in the prior art, as may be seen by reference to U.S. Pat. Nos. 5,477,827; 5,797,110; 5,457,633; 4,889,014; 5,738,606; 5,679,096 and 5,876,302, the disclosures of which are incorporated herein by reference. As is known, modern vehicular powertrains usually include electronically controlled engines, which may be controlled as to engine speed and/or engine torque. By way of example, according to the SAE J-1939 data link protocol, commands may be issued to the engine for fueling of the engine in accordance with (a) driver's fuel demand, (b) a requested engine speed, (c) a requested engine torque and/or (d) a requested maximum engine torque and/or engine speed.

While the prior art systems are effective to maintain an in-gear condition, the use of detents and/or constant urging in higher force actuators being required may result and/or undue wear on the shifting mechanism. In particular, the prior art includes systems having an in-gear detents for maintaining an in-gear condition. While effective, detents are not totally satisfactory as they require higher shift forces and may slow shifts. The prior art also includes systems which, upon sensing a partial disengagement, will urge jaw clutches towards full engagement. These systems are not totally satisfactory as force was applied to the shifting mechanism during torque lock, conditions which might result in undue wear and/or damage.

SUMMARY OF THE INVENTION

In accordance with the present invention, an improved control system/method for a vehicular powertrain is provided, which will tend to maximize in-gear retention while not requiring detents or relatively large capacity actuators and not causing undue wear and/or damage to the shifting elements.

The foregoing is accomplished by sensing a position indicative of the degree of jaw clutch engagement and also sensing engine output torque. If the engaged jaw clutch is not substantially fully engaged, the jaw clutch will be urged towards full engagement only when engine output torque is relatively low (such as less than 10%) of full torque.

Accordingly, it is an object of the present invention to provide a new and improved shift control for a vehicular drivetrain system, including a mechanical transmission wherein engine output torque is a control parameter in determining if an engaged jaw clutch should be urged towards the fully engaged position thereof.

This and other objects and advantages of the present invention will become apparent from a reading of the description of the preferred embodiment taken in connection with the attached drawings.

DESCRIPTION OF THE PREFERRED EMBODIMENT

Figure 1:
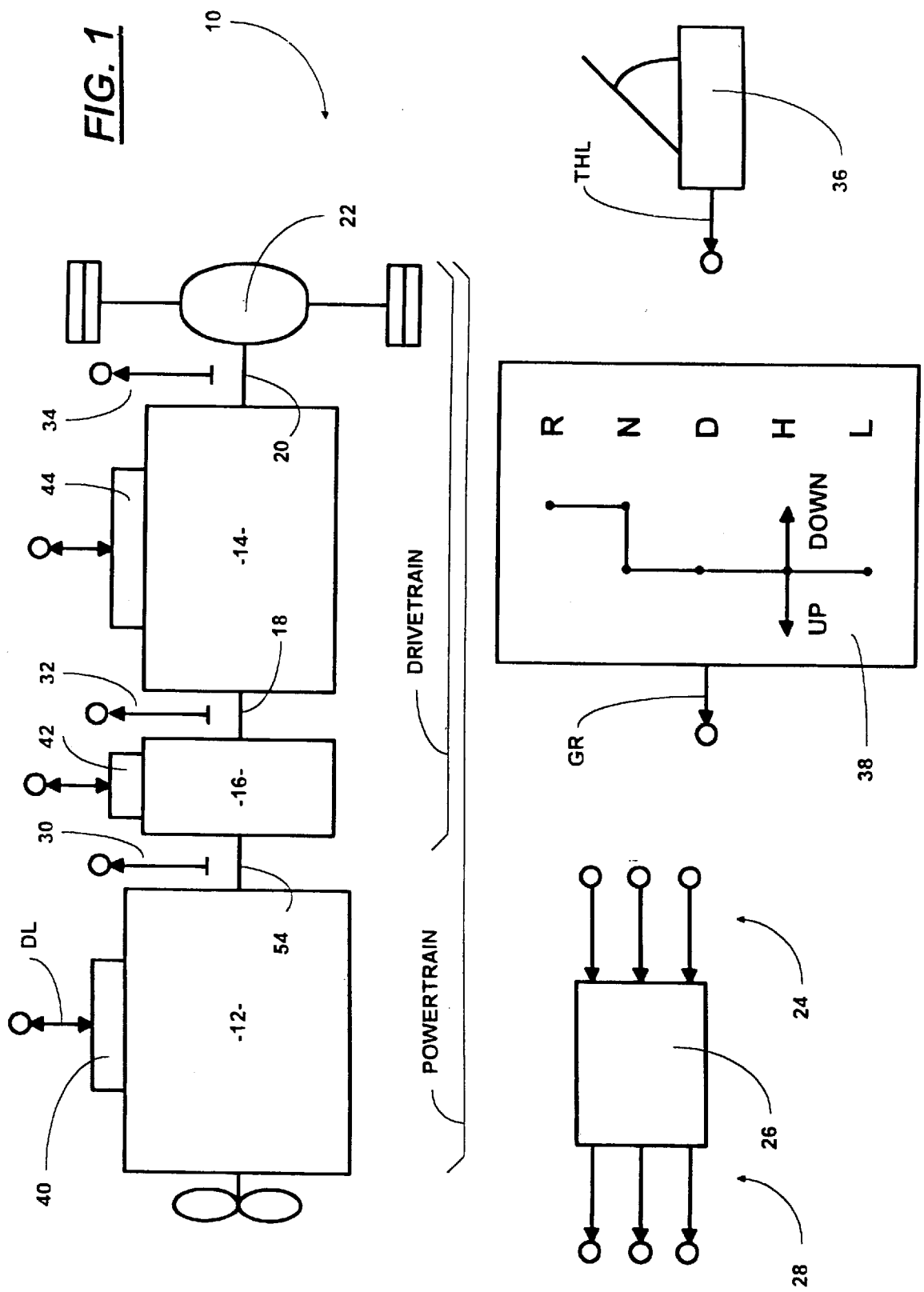
FIG. 1 is a schematic illustration of a vehicular powertrain system including an automated mechanical transmission system.

A vehicular powertrain system 10 of the type advantageously utilizing the control of the present invention may be seen by reference to FIG. 1. For purposes of illustration, system 10 is an automated mechanical transmission system including a fuel-controlled internal combustion engine 12 (such as a well-known diesel engine or the like), a multiple-speed mechanical transmission 14, and a non-positive coupling 16 for drivingly coupling the engine 12 to the transmission 14. Typically, non-positive coupling 16 will be a torque converter or a friction master clutch. The transmission 14 further includes an output shaft 20 for driving the vehicle drive axles 22. The drive axles may be of the single-speed or mulitple-speed type.

Transmission 14 is of the known mechanical type utilizing positive jaw clutches to engage and disengage selected gears to shafts for changing the ratio of input shaft rotational speed (IS) to output shaft rotational speed (OS). Transmissions of this are well known in the prior art and type may be seen by reference to U.S. Pat. Nos. 4,764,665; 5,385,056; 5,390,561 and 5,416,698.

System 10 may include a plurality of sensors for providing input signals 24 to a microprocessor-based control unit 26, which will process the input signals according to logic rules to generate command output signals 28 to various system actuators.

Speed sensors 30, 32 and 34 may be provided to provide input signals to the controller indicative of engine speed (ES), transmission input shaft speed (IS), and transmission output shaft speed (OS), respectively. A sensor 36 may be provided to provide an input signal indicative of the operator setting of the throttle pedal. A driver control console 38 is provided to allow the operator to select a transmission mode and to provide an input signal, GR, indicative thereof to the controller 26.

An engine controller 40, preferably microprocessor-based, may be provided for controlling fueling of the engine and for providing information to a data link, DL, indicative of the operating parameters of the engine including engine speed and engine torque. Preferably, the data link will comply with a known protocol, such as SAE J-1939 or the like. An actuator 42 may be provided for operating the non-positive coupling 16. A transmission actuator 44 may be provided for operating the transmission 14 and for providing signals indicative of the engaged gear ratio, jaw clutch member positions and/or other transmission operating parameters. Engaged ratio also may be calculated and/or confirmed by comparing the rotational speeds of the input and output shafts.

Figure 4:
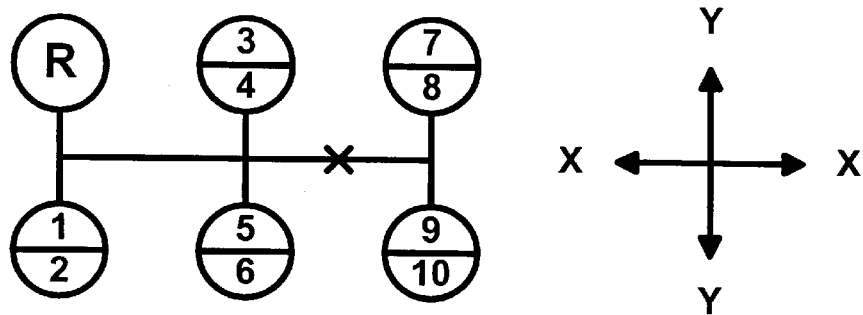
FIG. 4 is a schematic illustration of a typical shift pattern for a transmission.
Figure 2A:
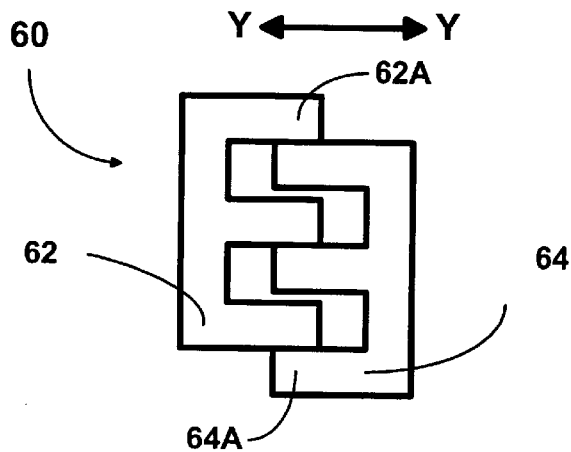
FIGS. 2A and 2B are schematic illustrations of, respectively, half and full degrees of jaw clutch engagement.
Figure 2B:
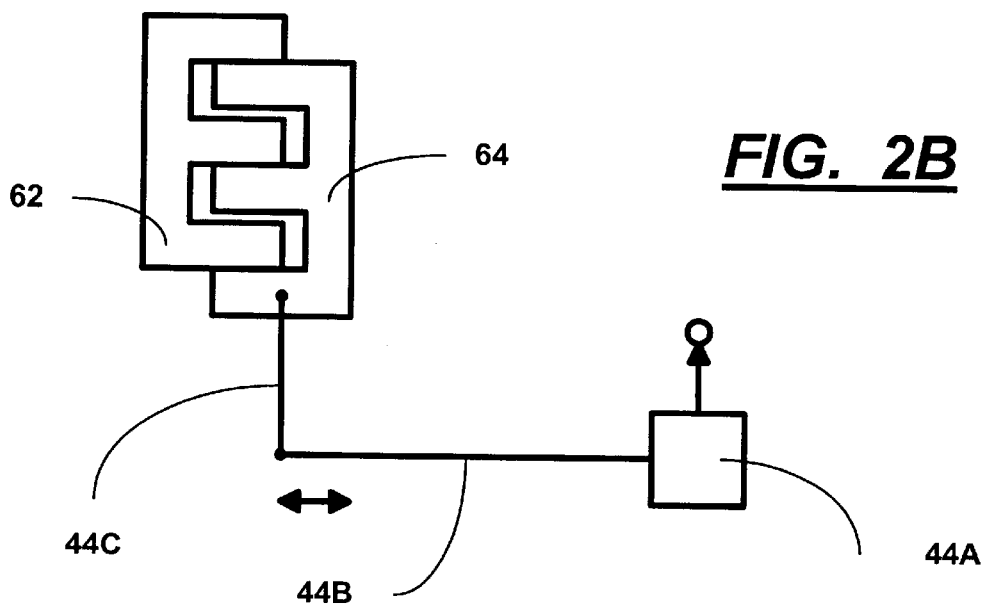
Figure 3:
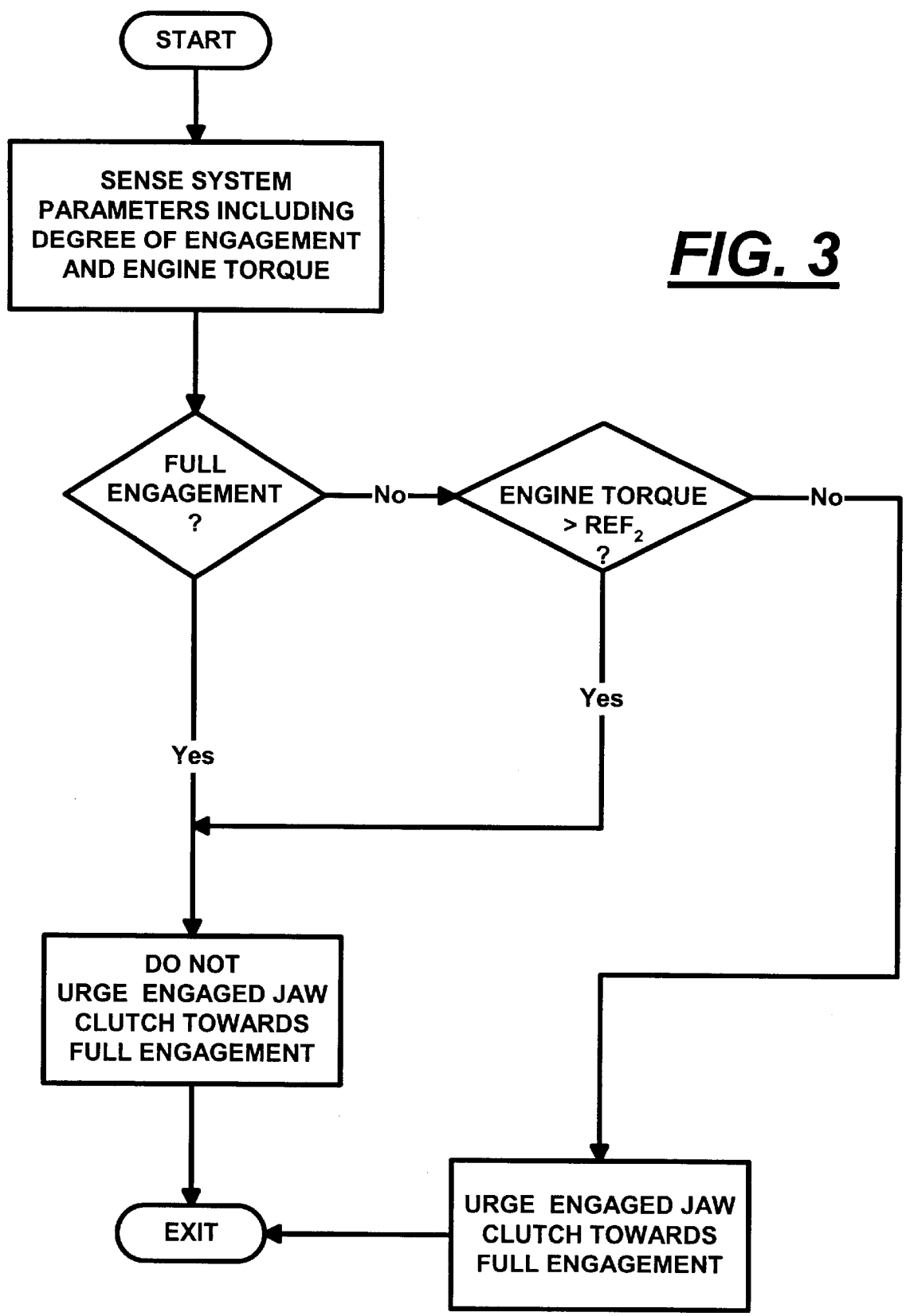
FIG. 3 is a flow chart representation of the control of the present invention.

The actuator 44 will include position sensors 44A that will provide information as to axial position of the shift rail or shift shaft 44B and associated shift fork(s) 44C used to axially position the jaw clutches for engaging and disengaging selected ratios (see FIG. 2B). Various types of position sensors, such as (by way of example but not limitation) mechanical detents, Hall effect switches and the like, may be utilized within the scope of the present invention and an example of such mechanisms may be seen by reference to U.S. Pat. Nos. 5,729,110 and 5,743,143, the disclosures of which are incorporated herein by reference. Axial position sensing may include logic for detecting deflection-type errors, as seen in U.S. Pat. No. 5,566,070. This is also referred to as the "Y-Y" position of an X-Y shift mechanism (see FIG. 4).

As used in this application, and as commonly used in the vehicular industry, the term "powertrain" will refer to the engine 12, coupling 16, transmission 14 and drive axles 12, while the term "drivetrain" will refer to the coupling 16, the transmission 14 and the axles 22.

In one preferred embodiment of the present invention, possible engine torque ("torque limit") is limited according to the sensed or expected engaged driveline ratio. By way of example, in a heavy-duty truck having a typical diesel engine, in the start ratios, torque may be limited to no more than 1300 foot-pounds, in direct drive, torque may be limited to 1800 foot-pounds, and in overdrive, if available torque may be limited to no more than 1600 foot-pounds.

In a preferred embodiment of the present invention, the maximum output torque of the engine is also limited by the sensed degree of engagement of the jaw clutch(es), see U.S. Pat No. 6,080,082.

As may be seen by reference to FIGS. 2A–2B, a jaw clutch 60 includes two jaw clutch members 62 and 64 carrying interengaging teeth 62A and 64A, which may be axially separated to disengage the clutch or moved axially together to engage the clutch. In the schematic illustration, clutch member 64 is moved axially relative to member 62 by a shift fork 44C associated with a shift rail 44B.

In FIG. 2A, the degree of clutch engagement is about 50%, and about 50% to 80% of the torque limit may be transmitted without causing damage to the clutch teeth. In this condition, full or high torque may cause torque lock, preventing full engagement and possibly damage to the shift members if the shift actuator attempts to urge the clutch towards full engagement.

In FIG. 2B, the clutch 60 is substantially fully engaged and there is no need to limit engine output torque as a function of degree of clutch engagement.

There will be a predetermined position for jaw clutch member 64, shift fork 44C, shift rail 44B and/or the shift actuator 44A which corresponds to full or substantially full engagement of the jaw clutch 60. If the sensed jaw clutch position moves away from predetermined position, and if the jaw clutch 60 is not being selectively disengaged, then the jaw clutch member should be moved back to the predetermined position. If this is attempted during high torque transfer conditions, the jaw clutch will be torque locked in the partially engaged position which may result in damage to and/or undue wear of the shifting elements and will not result in moving the jaw clutch members into a more acceptable condition.

According to the present invention, anytime the monitored jaw clutch member position is displaced from the predetermined acceptable position by greater than a set amount $((Y_{Sensed}+R_{EF})<Y_{ACCEPTABLE})$ and if sensed engine torque (which may be gross, flywheel or smoother sensed value) is less than the predetermined torque reference value (such as 7% to 10% of full torque), i.e., if $T_{Sensed}<REF_2$, then the clutch is urged back to the full engaged condition (FIG. 2B). In sensed engine $T_{Sensed}$ torque exceeds the reference value, then the actuator will be commanded to cease forcing or urging the clutch towards full engagement.

The above logic may also be utilized during initial jaw clutch engagement operations. The torque reference value, $REF_2$, may be a predetermined constant or may vary with engaged ratio or the like.

Although the present invention has been described with a certain degree of particularity, it is understood that various modifications are possible without departing from the spirit and scope of the invention as hereinafter claimed.

I claim:

1. A method for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable by a shift actuator (44) from a disengaged position to (a) a degree of engagement position wherein said clutch teeth are at less than substantially maximum engagement (FIG. 2A), and (b) a high degree of engagement position wherein said clutch teeth are at substantially maximum engagement (FIG. 2B), and a controller (26) for receiving input signals (24) including signals indicative of the degree of engagement of the jaw clutches and of engine output torque and processing same according to logic rules to issue command output signals to system actuators including said engine controller and said shift actuator, said method comprising the steps of:

(i) sensing engaged transmission ratio;
  (ii) sensing the degree of engagement of a jaw clutch associated with the engaged transmission ratio;
  (iii) sensing current engine output torque, and
  (iv) only if the sensed degree of engagement is less than substantially maximum jaw clutch engagement and engine output torque is less than a reference value, causing the jaw clutch to be urged towards maximum engagement.

2. The method of claim 1 wherein said powertrain includes a sensor for providing a signal indicative of the axial position of an element axially movable with at least one of said clutch members (64).

3. The method of claim 1 wherein said output torque is also limited as a function of engaged transmission ratio.

4. The method of claim 1 wherein said reference value ($REF_2$) is a function of engaged ratio.

5. The method of claim 1 wherein said engine has a rated maximum output torque, set reference value being less than 25% of said maximum output torque.

6. A system for controlling a vehicular powertrain system (10) comprising a fuel-controlled engine (12), an engine controller for controlling fueling of the engine (40), a multiple-speed transmission (14) having two or more ratios engaged and disengaged by positive jaw clutches (60), said jaw clutches including relatively axially movable first (62) and second (64) jaw clutch members carrying interengageable jaw clutch teeth (62A, 64A), said members relatively axially movable by a shift actuator (44) from a disengaged position to (a) a degree of engagement position wherein said clutch teeth are at less than substantially maximum engagement (FIG. 2A), and (b) a high degree of engagement position wherein said clutch teeth are at substantially maximum engagement (FIG. 2B), and a controller (26) for receiving input signals (24) including signals indicative of the degree of engagement of the jaw clutches and of engine output torque and processing same according to logic rules to issue command output signals to system actuators including said engine controller and said shift actuator, said logic rules including rules for:

(i) sensing engaged transmission ratio;

(ii) sensing the degree of engagement of a jaw clutch associated with the engaged transmission ratio;

(iii) sensing current engine output torque, and (iv) only if the sensed degree of engagement is less than substantially maximum jaw clutch engagement and engine output torque is less than a reference value, causing the jaw clutch to be urged towards maximum engagement.

7. The system of claim 6 wherein said powertrain includes a sensor for providing a signal indicative of the axial position of an element axially movable with at least one of said clutch members (64).

8. The system of claim 6 wherein said output torque is also limited as a function of engaged transmission ratio.

9. The system of claim 6 wherein said reference value ($REF_2$) is a function of engaged ratio.

10. The system of claim 6 wherein said engine has a rated maximum output torque, set reference value being less than 25% of said maximum output torque.

\* \* \* \* \*